(12) United States Patent
Jia et al.

(10) Patent No.: US 12,122,538 B2
(45) Date of Patent: Oct. 22, 2024

(54) SUSPENDING RELEASE DEVICE FOR OBSERVING DROP VIBRATION ATTITUDE CHANGES OF LANDER AND TEST METHOD

(71) Applicant: Nanjing University of Aeronautics and Astronautics, Nanjing (CN)

(72) Inventors: Shan Jia, Nanjing (CN); Jianhua Zhao, Nanjing (CN); Jinbao Chen, Nanjing (CN); Xianghua Zhou, Nanjing (CN); Sheng Zhang, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 81 days.

(21) Appl. No.: 17/632,575

(22) PCT Filed: Mar. 10, 2021

(86) PCT No.: PCT/CN2021/079846
§ 371 (c)(1),
(2) Date: Feb. 3, 2022

(87) PCT Pub. No.: WO2021/227626
PCT Pub. Date: Nov. 18, 2021

(65) Prior Publication Data
US 2023/0055684 A1    Feb. 23, 2023

(30) Foreign Application Priority Data
May 13, 2020    (CN) .................. 202010402184.X (51) Int. Cl.
*B64G 1/24* (2006.01)
*B01D 21/28* (2006.01)
(Continued)

(52) U.S. Cl.
CPC .......... *B64G 1/244* (2019.05); *B01D 21/283* (2013.01); *B64G 1/105* (2013.01); *B64G 1/36* (2013.01);
(Continued)

(58) Field of Classification Search
CPC .......... B64G 1/244; B64G 1/105; B64G 1/36; B64G 1/64; B64G 1/1071; G01H 3/00;
(Continued)

(56) References Cited

U.S. PATENT DOCUMENTS

2023/0055684 A1* 2/2023 Jia ........................... B64G 7/00

FOREIGN PATENT DOCUMENTS

| CN | 101000238 A | * | 7/2007 |
| CN | 101698282 A | * | 4/2010 |

(Continued)

*Primary Examiner* — Stephanie E Bloss
*Assistant Examiner* — Kevin C Butler
(74) *Attorney, Agent, or Firm* — Morse, Barnes-Brown & Pendleton, P.C.; Martin Z. Zhang, Esq.

(57) ABSTRACT

A suspending release device for observing a drop vibration attitude change of a lander and a test method are provided. The device includes a bench system, a lifting system fixed to the bench system, a horizontal frame system, an attitude control system, and a suspending release system hinged to the attitude control system. The horizontal frame system may slide vertically on the bench system and may drive the attitude control system to slide horizontally. A test lander is fixed to a release sliding block. The release sliding block is locked with a main load bearing block. An attitude of the test lander when releasing is adjusted. The horizontal frame system is lifted to a predetermined height. Guide rods are indirectly driven to release the sliding block by a motor. The whole lander falls freely and touches the ground to collide, and the process is recorded by a high-speed camera.

6 Claims, 5 Drawing Sheets

(51) Int. Cl.
*B64G 1/10* (2006.01)
*B64G 1/36* (2006.01)
*B64G 1/64* (2006.01)
*G01H 3/00* (2006.01)
*G01M 1/22* (2006.01)
*G01M 3/24* (2006.01)
*G01V 1/00* (2006.01)

(52) U.S. Cl.
CPC ................. *B64G 1/64* (2013.01); *G01H 3/00* (2013.01); *G01M 1/22* (2013.01); *G01M 3/243* (2013.01); *G01V 1/001* (2013.01); *B64G 1/1071* (2023.08)

(58) Field of Classification Search
CPC ...... B01D 21/283; G01M 1/22; G01M 3/243; G01V 1/001
USPC ............................................................. 73/570
See application file for complete search history.

(56) References Cited

FOREIGN PATENT DOCUMENTS

| | | | | | |
|---|---|---|---|---|---|
| CN | 202442858 | U | * | 9/2012 | |
| CN | 103323202 | A | * | 9/2013 | |
| CN | 103335803 | A | * | 10/2013 | |
| CN | 103350758 | A | * | 10/2013 | |
| CN | 106347711 | A | * | 1/2017 | ............. B64G 1/002 |
| CN | 106644347 | A | * | 5/2017 | |
| CN | 208067528 | U | * | 11/2018 | |
| CN | 109708541 | A | * | 5/2019 | |
| CN | 111693309 | A | * | 9/2020 | ............. B64G 1/105 |
| CN | 212367416 | U | * | 1/2021 | |
| CN | 117048846 | A | * | 11/2023 | |
| CN | 117231894 | A | * | 12/2023 | |
| JP | 2010237026 | A | * | 10/2010 | |
| KR | 101669477 | B1 | * | 7/2016 | ............. G01M 7/08 |
| SU | 470725 | A1 | * | 5/1975 | ............. G01M 7/00 |

* cited by examiner

SUSPENDING RELEASE DEVICE FOR OBSERVING DROP VIBRATION ATTITUDE CHANGES OF LANDER AND TEST METHOD

CROSS REFERENCE TO RELATED APPLICATION

This application is a national stage application of International Patent Application No. PCT/CN2021/079846, filed on Mar. 10, 2021, which claims the priority of Chinese Patent Application No. 202010402184.X entitled "SUSPENDING RELEASE DEVICE FOR OBSERVING DROP VIBRATION ATTITUDE CHANGES OF LANDER TEST METHOD" filed with the Chinese Patent Office on May 13, 2020, the disclosure of which is incorporated by reference herein in its entirety as part of the present application.

TECHNICAL FIELD

The present disclosure belongs to the field of space exploration, and particularly, relates to a suspending release device for observing drop vibration attitude changes of a lander and a test method.

BACKGROUND ART

In recent years, achievements of China in aerospace industry are obvious to all people. Lunar exploration and deep space exploration are of great significance to human development. In a development stage, it is an essential link to perform a drop vibration test for a whole lander in the ground environment, so as to use in lunar exploration, Mars exploration, and asteroid exploration landers, thereby obtaining the buffering performance of a soft landing device and the changes and reliability of drop vibration attitudes of the whole lander through experiments, and further providing data support for subsequent design improvement.

However, by investigating relevant domestic research data, it is found that the traditional test device for a ground drop vibration test system of the whole lander in China at present is generally suspended by a rope, and released by an electromagnetic chuck or a hanging hook. Although a drop vibration process can also be simulated, a falling attitude of the lander at the moment of release is very difficult to be accurately determined due to the instability of the rope. Therefore, when the lander is approaching the ground, it is difficult to simulate a landing condition of attitude instability.

Therefore, it is necessary to develop a suspending release device that can simulate all working conditions, such as different falling attitudes and falling velocities of the lander body, and relative included angles between the lander body and a star surface.

SUMMARY

In view of the above mentioned disadvantages in the prior art, a suspending release device for observing drop vibration attitude changes of a lander and a test method are proposed. The device of the present disclosure avoids the shaking caused by the rope suspension before releasing and the uncertainty of an attitude when releasing in a drop vibration test for a whole lander. Therefore, an attitude of a body of the lander before landing can be simulated to a greater extent.

The present disclosure is implemented as follows.

The suspending release device for observing drop vibration attitude changes of a lander includes a bench system, a lifting system, a horizontal frame system, an attitude control system, and a suspending release system. The lifting system is fixed to the bench system. The horizontal frame system is configured to be vertically slide on the bench system and may drive the attitude control system to slide horizontally to simulate a horizontal velocity when releasing. The suspending release system is hinged to the attitude control system. A test lander is fixed to a release sliding block. The release sliding block is locked with a main load bearing block. An attitude of the test lander when being released may be adjusted. The horizontal frame system is lifted to a predetermined height. A signal is sent to a driver by a controller, and guide rods are indirectly driven to release the sliding block by a motor. The whole lander falls freely, and touches and collides with the ground under the action of gravity, and the whole process is recorded by high-speed cameras.

Further, the bench system may include a top fixed frame, four vertical sliding rails, flanges, and a ground simulation plate. The four vertical sliding rails may be fixed to the ground simulation plate through the four flanges. The top fixed frame may be fixed to top ends of the four vertical sliding rails through welding. The lifting system may be arranged at a lower end of the top fixed frame. The high-speed cameras may be arranged on the ground simulation plate.

Further, the lifting system may include an electric hoist fixed to the lower end of the top fixed frame and a hook lock fixed to a top end of the horizontal frame system.

Further, the horizontal frame system may include square steel frames, bearing fixing sleeves, first linear bearings, a front suspension plate, a rear suspension plate, a lead screw, two horizontal sliding rails, two lead screw bearing seats, a first motor bracket, a shaft coupling, a first motor, a horizontal sliding block, a lead screw nut, and second linear bearings.

Each of the first linear bearings may be fixed to an inner side of a corresponding one of the bearing fixing sleeves. The bearing fixing sleeves may be fixed to two sides of each of the square steel frames, respectively. An upper end and a lower end of the front suspension plate, and an upper end and a lower end of the rear suspension plate may be each fixed with one of the square steel frames. An end of the first motor bracket may be fixed to the front suspension plate, and another end of the first motor bracket may be fastened to the first motor. The lead screw may be fixed to the two lead screw bearing seats that may be on the front suspension plate and the rear suspension plate, respectively. The two horizontal sliding rails may be fixed between the front suspension plate and the rear suspension plate, and may be located on two sides of the lead screw. Two sides of the shaft coupling may be coupled to the first motor and the lead screw, respectively. The lead screw nut may be fixed in one side of an intermediate through hole of the horizontal sliding block. The second linear bearings may be fixed in through holes on both sides of the horizontal sliding block.

Further, the attitude control system may include a top plate, two vertical load bearing rods, a first spherical hinge, an electric push rod, and second spherical hinges. Upper ends of the two vertical load bearing rods may be fixed to a lower end of the top plate. A lower end of each of the two vertical load bearing rods may be connected to a corresponding one of the second spherical hinges. The lower end of the top plate may be further connected to the electric push rod through the first spherical hinge. A telescopic structure at a lower end of the electric push rod may be connected to a corresponding one of the second spherical hinges. The attitude control system may be fixed to the lower end of the horizontal frame system by the top plate.

Further, the suspending release system may include a main load bearing block, a large gear disc, a bearing, rivets, transmission rods, screws, guide rods, third linear bearings, a release sliding block, a small gear disc, a second motor and a second motor bracket.

The large gear disc may be arranged on an upper side of the main load bearing block. The bearing may be sleeved in a center of the large gear disc. Each transmission rod of the transmission rods may be hinged to the large gear disc and a corresponding one of the guide rods through a respective one of the rivets and a respective one of the screws. The respective one of the rivets and the respective one of the screws may be arranged at two ends of the transmission rod, respectively. The release sliding block may be arranged at a lower end of the main load bearing block. Four side surfaces of the main load bearing block and four side surfaces of the release sliding block may be each provided with a hole. The hole in each of the four side surfaces of the main load bearing block may be matched and communicated correspondingly with the hole in each of the four side surfaces of the release sliding block. A corresponding one of the third linear bearings may be arranged on an inner wall of the hole.

An inward concave part of the main load bearing block may be of a regular quadrilateral structure, and may be configured to be locked and completely engaged with the release sliding block by retracting each of the guide rods in a corresponding one of the third linear bearings. The second motor may be fixed to the main load bearing block through the second motor bracket. The small gear disc may be fixed to the second motor. The large gear disc and the small gear disc may be configured to engage to complete a transmission process.

The present disclosure further discloses a test method for a suspending release device for observing a drop vibration attitude changes of a lander. The method includes the following steps:

step one, checking whether parts of the bench system, the lifting system, the horizontal frame system, the attitude control system, the suspending release system, high-speed cameras work normally, and fixing a release sliding block included in the suspending release system and the lander;

step two, engaging the release sliding block and the inward concave part of a main load bearing block included in the suspending release system, and sending an electric pulse signal of a fixed frequency and time to a driver by a controller, controlling a second motor included in the suspending release system by the driver to start rotating, driving a large gear disc included in the suspending release system by a small gear disc included in the suspending release system to rotate, and driving each of guide rods by a corresponding one of transmission rods included in the suspending release system to retract and lock towards a center of the inward concave part of the main load bearing block according to a crank-sliding block principle;

step three, determining a release attitude of the suspending release system to be at a predetermined horizontal or inclined angle by controlling a length of a telescopic structure in the electric push rod;

step four, lifting the horizontal frame system to a predetermined height through the lifting system, and starting the high-speed cameras to conduct video recording;

step five, sending an electric pulse signal of a predetermined frequency to the driver by the controller, driving a first motor included in the horizontal frame system by the driver to rotate at a preset rotating velocity, and driving a horizontal sliding block included in the horizontal frame system to slide at a preset horizontal velocity; sending an electric pulse signal with high frequency and short time by the controller after the horizontal sliding block reaches a predetermined position, and controlling the second motor by the driver to work, driving the guide rods to slide outwards, unlocking the release sliding block releasing the lander according to a predetermined attitude, and recording data continuously by the high-speed cameras; and step six, rechecking an operating state of each of the parts of the bench system, the lifting system, the horizontal frame system, the attitude control system, the suspending release system, high speed cameras, setting a next group of horizontal velocity and release attitude, and repeating above steps to continue test.

Compared with the prior art, the embodiments have the following beneficial effects.

(1) The lander cannot shake randomly before being released, and the attitude of the lander when being released can be set through the attitude control system, so as to simulate the horizontal or inclined working condition of a body attitude before the lander touches the ground.

(2) The whole device is simple in structure, and facilitates installation and subsequent maintenance under the condition of ensuring the structural strength. All of the release height, the horizontal velocity when releasing, and the release attitude of the lander in the whole test process can be determined, so that the controllability is strong, and accurate test data can be obtained.

(3) In the suspending release system, the guide rods extend and retract in the respective linear bearings, and end faces of inner sides of the guide rods are of hemispherical structures, so the guide rods are smooth and stable when being unlocked, the resistance is low, and the reliability is high.

LIST OF THE REFERENCE CHARACTERS 1 bench system; 2 lifting system; 3 horizontal frame system; 4 attitude control system; 5 suspending release system; 6 high-speed camera; 7 test lander; 11 top fixed frame; 12 vertical sliding rail; 13 flange; 14 ground simulation plate; 21 electric hoist; 22 hook lock; 301 square steel frame; 302 bearing fixing sleeve; 303 first linear bearing; 304 front suspension plate; 305 rear suspension plate; 306 lead screw; 307 horizontal sliding rail; 308 lead screw bearing seat; 309 first motor bracket; 310 shaft coupling; 311 first motor; 312 horizontal sliding block; 313 lead screw nut; 314 second linear bearing; 41 top plate; 42 vertical load bearing rod; 43 first spherical hinge; 44 electric push rod; 45 second spherical hinge; 501 main load bearing block; 502 large gear disc; 503 bearing; 504 rivet; 505 transmission rod; 506 screw; 507 guide rod; 508 third linear bearing; 509 release sliding block; 510 small gear disc; 511 second motor; 512 second motor bracket; and 513 limiting groove.

DETAILED DESCRIPTION OF THE EMBODIMENTS

In order to make the purpose, technical solution, and effect of the present disclosure more clear and definite, the following examples are listed to further describe the present disclosure in detail. It is to be understood that specific embodiment described herein are merely illustrative of the present disclosure and are not intended to limit the present disclosure.

Figure 1:
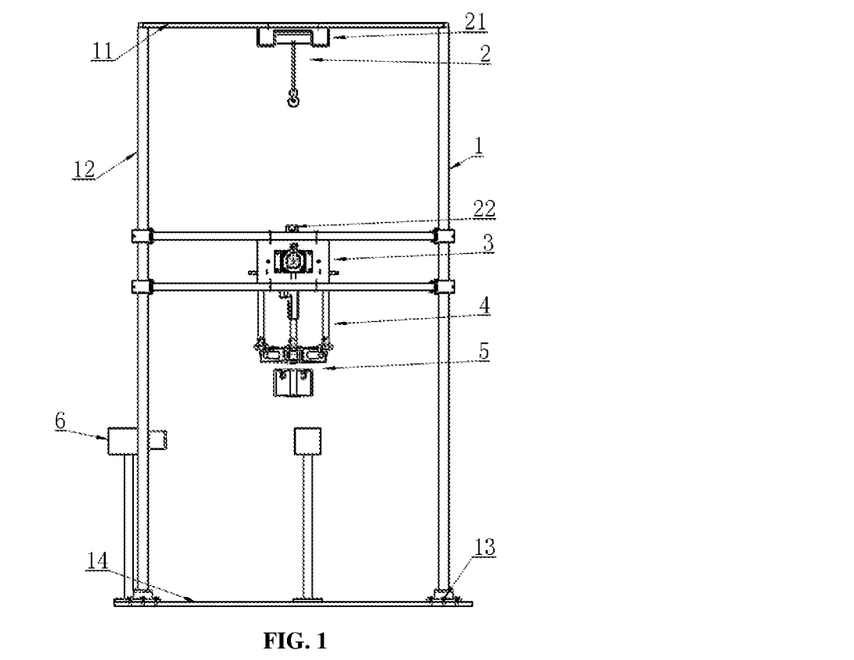
FIG. 1 is a left view of a suspending release device for observing drop vibration attitude changes of a lander according to the present disclosure.

As shown in FIG. 1, a suspending release device for observing drop vibration attitude changes of a lander includes a bench system 1, a lifting system 2, a horizontal frame system 3, an attitude control system 4, a suspending release system 5, and a high-speed camera 6. The lifting system 2 is fixed to the bench system 1. The horizontal frame system 3 is arranged on the bench system 1 and is configured to be vertically slide. An upper end of the attitude control system 4 is fixed to the horizontal frame system 3 and a lower end of the attitude control system 4 is arranged on the suspending release system 5. The high-speed camera 6 is arranged on a ground simulation plate 14 of the bench system 1 to observe the drop vibration attitude changes of the lander.

As shown in FIGS. 2 to 7, the bench system 1 in the present disclosure includes a top fixed frame 11, vertical sliding rails 12, flanges 13, and the ground simulation plate 14. Four vertical sliding rails 12 are fixed to the ground simulation plate 14 through the four flanges 13. The top fixed frame 11 is fixed to the four vertical sliding rails 12 through welding, so as to maintain the stability of the overall device. Sandy soil that is similar to lunar soil may be laid or a slope may be piled on the ground simulation plate 14 to simulate a lunar surface environment more truly.

The lifting system 2 includes an electric hoist 21 and a hook lock 22. The electric hoist 21 is fixed to a lower end of the top fixed frame 11. The hook lock 22 is fixed to square steel frames 301.

Figure 2:
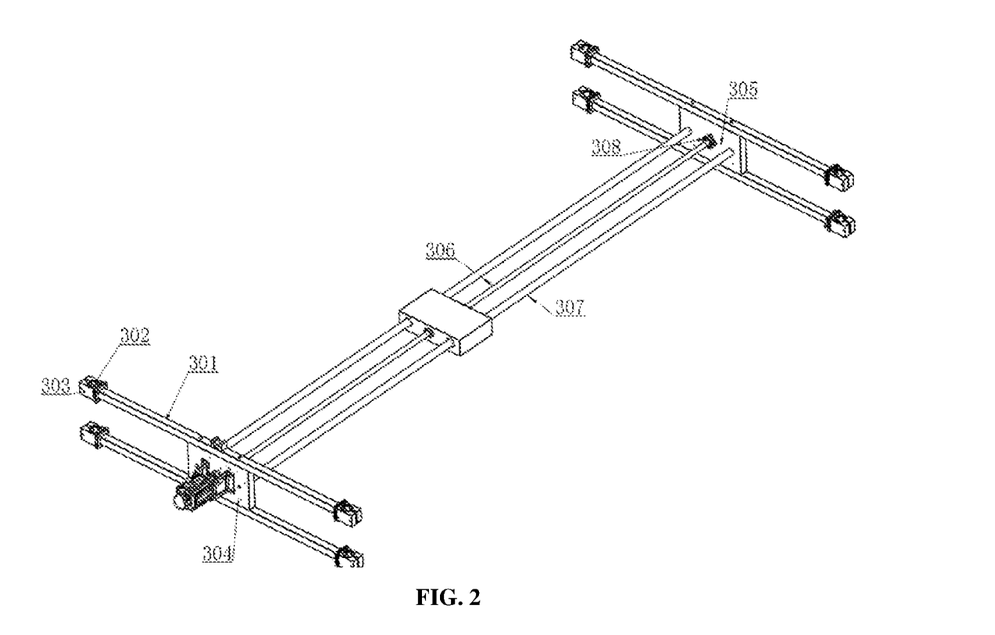
FIG. 2 is a three-dimensional structural diagram of a horizontal frame system in the suspending release device for observing the drop vibration attitude changes of the lander according to the present disclosure.
Figure 3:
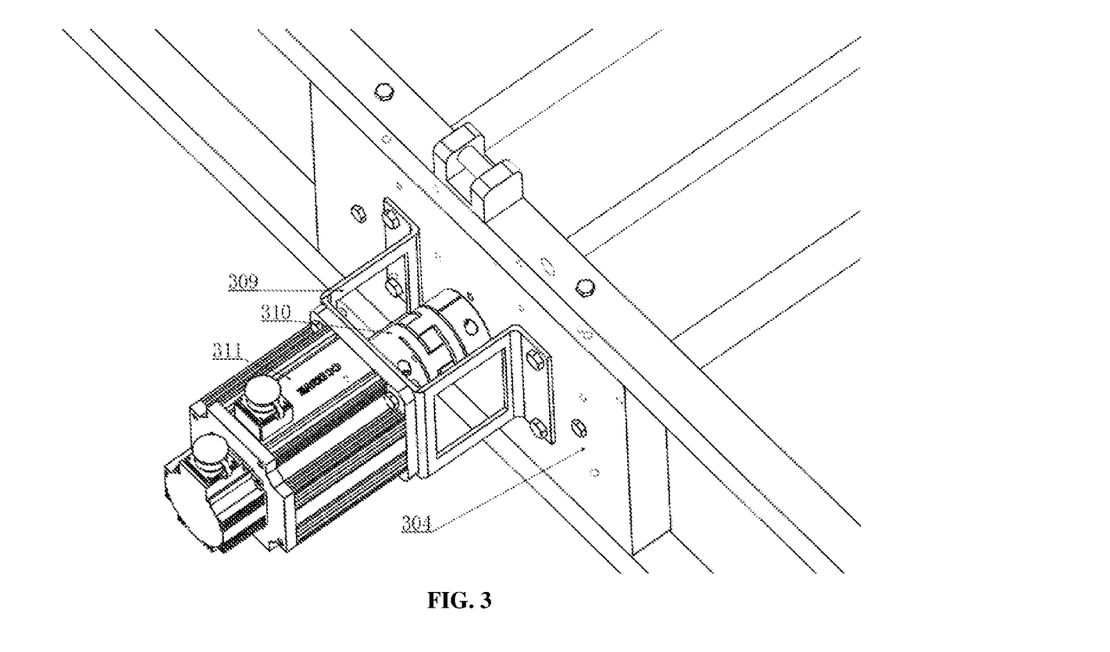
FIG. 3 is a three-dimensional structural diagram of a first motor part in the suspending release device for observing the drop vibration attitude changes of the lander according to the present disclosure.
Figure 4:
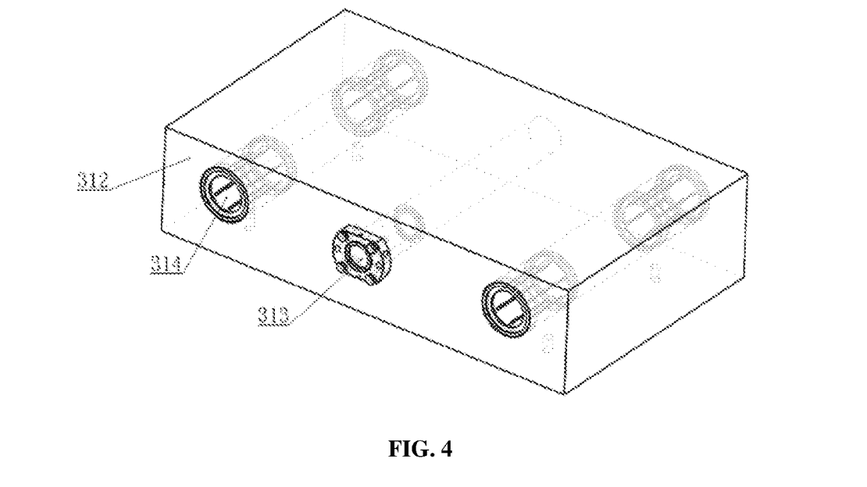
FIG. 4 is a three-dimensional structural diagram of a horizontal sliding block part in the suspending release device for observing the drop vibration attitude changes of the lander according to the present disclosure.

The horizontal frame system 3 includes the square steel frames 301, bearing fixing sleeves 302, first linear bearings 303, a front suspension plate 304, a rear suspension plate 305, a lead screw 306, horizontal sliding rails 307, lead screw bearing seats 308, a first motor bracket 309, a shaft coupling 310, a first motor 311, a horizontal sliding block 312, a lead screw nut 313, and second linear bearings 314. The first linear bearings 303 are each fixed to an inner side of a corresponding one of the bearing fixing sleeves 302. The bearing fixing sleeves 302 can adjust the clamping tightness to the first linear bearings 303, that is, the first linear bearings 303 are neither clamped too tightly to cause deformation nor too loosely to cause falling off. The bearing fixing sleeves 302 are fixed to two sides of each square steel frame 301. An upper end and a lower end of the front suspension plate 304 and an upper end and a lower end of the rear suspension plate 305 are each fixed with one of the square steel frames 301. An end of the first motor bracket 309 is fixed to the front suspension plate 304, and another end of the first motor bracket 309 is fastened to the first motor 311. The lead screw 306 is fixed to the lead screw bearing seats 308 on the front suspension plate 304 and the rear suspension plate 305, respectively. Two horizontal sliding rails 307 are parallel to each other and are fixed on the front suspension plate 304 and the rear suspension plate 305. Two sides of the shaft coupling 310 are coupled to the first motor 311 and the lead screw 306, respectively. The lead screw nut 313 is fixed in one side of an intermediate through hole of the horizontal sliding block 312. The second linear bearings 314 are fixed in the through holes on both sides of the horizontal sliding block 312. When the test lifts a predetermined height, the horizontal sliding block 312 is on a side close to the front suspension plate 304, and a vector direction simulating a horizontal velocity is pointing from the front suspension plate 304 to the rear suspension plate 305.

Figure 5:
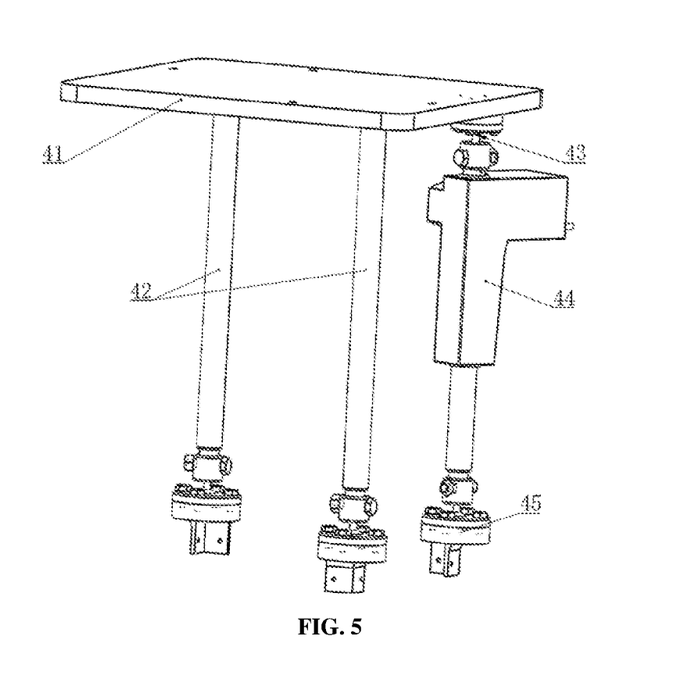
FIG. 5 is a three-dimensional structural diagram of an attitude control system in the suspending release device for observing the drop vibration attitude changes of the lander according to the present disclosure.

The attitude control system 4 includes a top plate 41, vertical load bearing rods 42, a first spherical hinge 43, an electric push rod 44, and second spherical hinges 45. Upper ends of two vertical load bearing rods 42 are fixed to a lower end of the top plate 41, and lower ends of the vertical load bearing rods 42 are coupled to the respective second spherical hinges 45. An upper end of the electric push rod 44 is coupled to the first spherical hinge 43 fixed to the top plate 41. And a telescopic structure at a lower end of the electric push rod 44 is coupled to the second spherical hinge 45.

Figure 6:
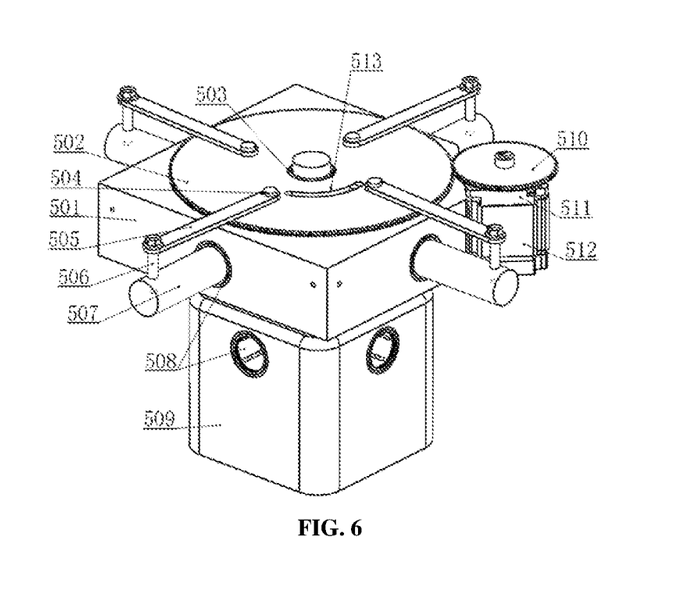
FIG. 6 is a three-dimensional structural diagram of a suspending release system in the suspending release device for observing the drop vibration attitude changes of the lander according to the present disclosure.
Figure 7:
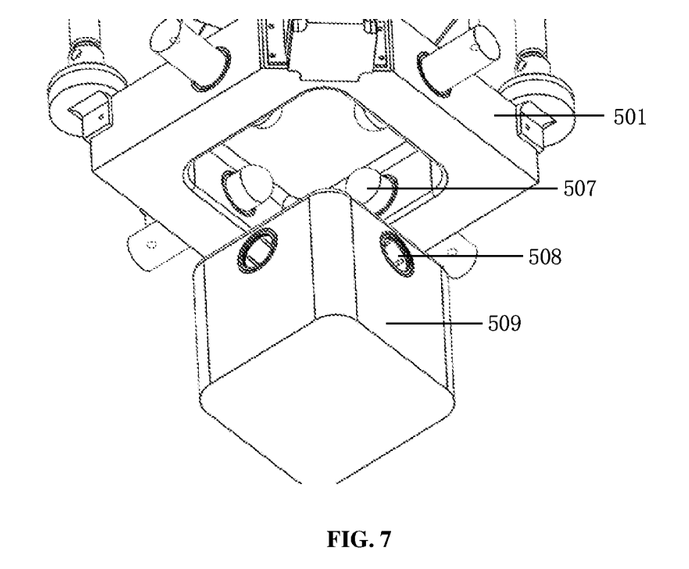
FIG. 7 is a three-dimensional structural diagram of an unlocking part in the suspending release system in the suspending release device for observing the drop vibration attitude changes of the lander according to the present disclosure.

The suspending release system 5 includes a main load bearing block 501, a large gear disc 502, a bearing 503, rivets 504, transmission rods 505, screws 506, guide rods 507, third linear bearings 508, a release sliding block 509, a small gear disc 510, a second motor 511, and a second motor bracket 512. The large gear disc 502 is arranged on an upper side of the main load bearing block 501. The bearing 503 is sleeved in the large gear disc 502, so as to reduce friction. The transmission rod 505 are hinged to the large gear disc 502 and the guide rod 507 through the rivet 504 and the screw 506 arranged on two sides of the transmission rods 505. Each side surface of the main load bearing block 501 and each side surface of the release sliding block 509 is formed with a hole, and the third linear bearing 508 is fixed to an interior of the hole. An inward concave part of the main load bearing block 501 is of a regular quadrilateral structure, and is configured to be locked and completely engaged with the release sliding block 509 by retracting each of the guide rods 507 in a corresponding one of the linear bearings 508. The second motor 511 is fixed to the main load bearing block 501 through the second motor bracket 512. A small gear disc 510 is fixed to the second motor 511. A transmission process can be completed through the engagement of the large gear disc 502 and the small gear disc 510. A limiting groove 513 is formed in the large gear disc 502, and the large gear disc 502 can be prevented from rotating excessively when the second motor 511 is out of control by matching a small boss on the main load bearing block. End faces of inner sides of the guide rods 507 are hemispherical, so that the guide rods 507 are withdrawn from the third linear bearings 508 in the release sliding block 509 more smoothly, and the release sliding block 509 can be released more stably at the moment of releasing.

A test method for observing drop vibration attitude changes of a lander of the present disclosure includes the following steps (1)-(6).

In step (1), whether parts of each subsystem (i.e., the bench system 1, the lifting system 2, the horizontal frame system 3, the attitude control system 4, the suspending release system 5, high speed cameras 6) work normally is checked, and a release sliding block 509 is fixed with a test lander 7. The fixedly connecting manner is not unique, depending on the shape of the lander, as long as it should not affect the weight distribution of the test lander 7 as much as possible.

In step (2), the release sliding block 509 is engaged with the inward concave part of the main load bearing block 501, and an electric pulse signal of a fixed frequency and time is sent to a driver by a controller, so that the driver controls the second motor 511 to start rotating, then the small gear disc 510 drives the large gear disc 502 to rotate, and the transmission rods 505 drive the guide rods 507 to retract and lock towards a center of the inward concave part of the main load bearing block 501 according to a crank-sliding block principle.

In step (3), a release attitude of the suspending release system 5 is determined to be at a predetermined horizontal or inclined angle by controlling a length of a telescopic rod in an electric push rod 44.

In step (4), the horizontal frame system 3 is lifted to the predetermined height through a lifting system 2, and the high-speed camera 6 is started to conduct video recording.

In step (5), an electric pulse signal of a predetermined frequency is sent to the driver by the controller, the driver drives the first motor 311 to rotate at a preset rotating velocity, and drives the horizontal sliding block 312 to slide at a preset horizontal velocity. An electric pulse signal with high frequency and short time is sent by the controller after the horizontal sliding block reaches a predetermined position, and the driver controls a second motor 511 to work, so that the guide rods 507 are driven to slide outwards, the release sliding block 509 is unlocked and the test lander 7 is released according to a predetermined attitude, and the high-speed camera 6 records data continuously.

Figure 8:
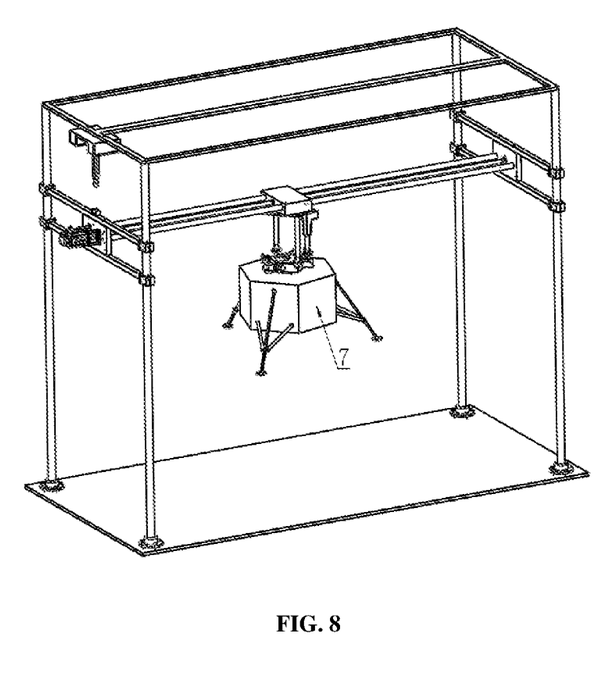
FIG. 8 is a three-dimensional structural diagram of a simulation test according to an embodiment the present disclosure.
Figure 9:
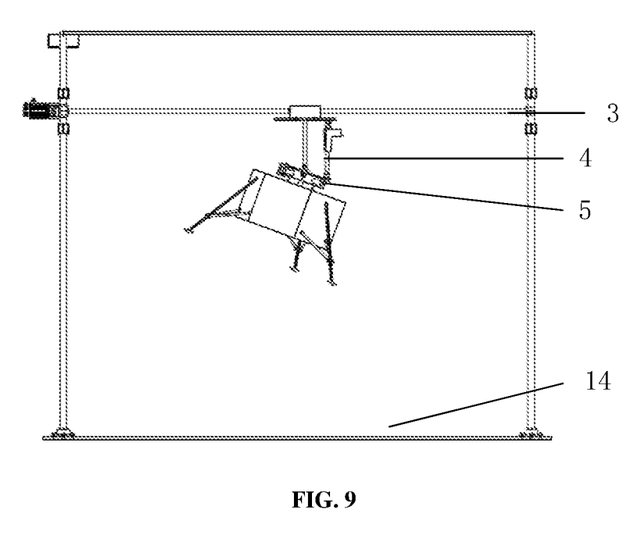
FIG. 9 is a front view of an inclined release attitude of the simulation test according to an embodiment of the present disclosure.

In step (6), an operating state of each part of the subsystem equipment is rechecked, a next group of horizontal velocity and release attitude are set, step (2) to step (5) are repeated to continue the test. The simulated test is as shown in FIGS. 8 to 9.

The foregoing descriptions are merely preferred embodiments of the present disclosure. It should be noted that those of ordinary skill in the art may make several improvements without departing from the principle of the present disclosure. These improvements shall fall within the scope of protection of the present disclosure.

What is claimed is:

1. A test method for a suspending release device for observing the drop vibration attitude changes of a lander, the device comprising a bench system (1), wherein a lifting system (2) is arranged at a top end of the bench system (1); a horizontal frame system (3) is arranged in a horizontal direction of the bench system (1) and is configured to vertically slide along the bench system (1); an attitude control system (4) and a suspending release device (5) are arranged at a lower end of the horizontal frame system (3) in sequence; and high-speed cameras (6) configured to observe the drop vibration attitude changes of the lander are further arranged in the suspending release device;

the test method comprising:

checking whether parts of the bench system (1), the lifting system (2), the horizontal frame system (3), the attitude control system (4), the suspending release system (5), high-speed cameras (6) work normally, and fixing a release sliding block (509) comprised in the suspending release system (5) and the lander (7);

engaging the release sliding block (509) and the inward concave part of a main load bearing block (501) comprised in the suspending release system (5), and sending an electric pulse signal of a fixed frequency and time to a driver by a controller, controlling a second motor (511) comprised in the suspending release system (5) by the driver to start rotating, driving a large gear disc (502) comprised in the suspending release system (5) by a small gear disc (510) comprised in the suspending release system (5) to rotate, and driving each of guide rods (507) by a corresponding one of transmission rods (505) comprised in the suspending release system (5) to retract and lock towards a center of the inward concave part of the main load bearing block (501) according to a crank-sliding block principle;

determining a release attitude of the suspending release system (5) to be at a predetermined horizontal or inclined angle by controlling a length of a telescopic structure in the electric push rod (44);

lifting the horizontal frame system (3) to a predetermined height through the lifting system (2), and starting the high-speed cameras (6) to conduct video recording;

sending an electric pulse signal of a predetermined frequency to the driver by the controller, driving a first motor (311) comprised in the horizontal frame system (3) by the driver to rotate at a preset rotating velocity, and driving a horizontal sliding block (312) comprised in the horizontal frame system (3) to slide at a preset horizontal velocity; sending an electric pulse signal with high frequency and short time by the controller after the horizontal sliding block reaches a predetermined position, and controlling the second motor (511) by the driver to work, driving the guide rods (507) to slide outwards, unlocking the release sliding block (509) releasing the lander (7) according to a predetermined attitude, and recording data continuously by the high-speed cameras (6);

rechecking an operating state of each of the parts of the bench system (1), the lifting system (2), the horizontal frame system (3), the attitude control system (4), the suspending release system (5), high-speed cameras (6), setting a next group of horizontal velocity and release attitude, and repeating above steps to continue test.

2. The test method according to claim 1, wherein the bench system (1) comprises a top fixed frame (11), four vertical sliding rails (12), flanges (13), and a ground simulation plate (14), wherein the four vertical sliding rails (12) are fixed to the ground simulation plate (14) through the four flanges (13); the top fixed frame (11) is fixed to top ends of the four vertical sliding rails (12) through welding; the lifting system (2) is arranged at a lower end of the top fixed frame (11); and the high-speed cameras (6) are arranged on the ground simulation plate (14).

3. The test method according to claim 2, wherein the lifting system (2) comprises an electric hoist (21) fixed to the lower end of the top fixed frame (11) and a hook lock (22) fixed to a top end of the horizontal frame system (3).

4. The test method according to claim 3, wherein the horizontal frame system (3) comprises square steel frames (301), bearing fixing sleeves (302), first linear bearings (303), a front suspension plate (304), a rear suspension plate (305), a lead screw (306), horizontal sliding rails (307), two lead screw bearing seats (308), a first motor bracket (309), a shaft coupling (310), the first motor (311), the horizontal sliding block (312), a lead screw nut (313), and second linear bearings (314);

each of the first linear bearings (303) is fixed to an inner side of a corresponding one of the bearing fixing sleeves (302); the bearing fixing sleeves (302) are fixed to two sides of each of the square steel frames (301), respectively; an upper end and a lower end of the front suspension plate (304), and an upper end and a lower end of the rear suspension plate (305) are each fixed with one of the square steel frames (301); an end of the first motor bracket (309) is fixed to the front suspension plate (304), and an other end of the first motor bracket (309) is fastened to the first motor (311); the lead screw (306) is fixed to the two lead screw bearing seats (308) that are on the front suspension plate (304) and the rear suspension plate (305), respectively; two horizontal sliding rails (307) are fixed between the front suspension plate (304) and the rear suspension plate (305), and are located on two sides of the lead screw (306); two sides of the shaft coupling (310) are coupled to the first motor (311) and the lead screw (306), respectively; the lead screw nut (313) is fixed in one side of an intermediate through hole of the horizontal sliding block (312); and the second linear bearings (314) are fixed in through holes on both sides of the horizontal sliding block (312).

5. The test method according to claim 1, wherein the attitude control system (4) comprises a top plate (41), two vertical load bearing rods (42), a first spherical hinge (43), an electric push rod (44), and second spherical hinges (45); upper ends of the two vertical load bearing rods (42) are fixed to a lower end of the top plate (41); a lower end of each of the two vertical load bearing rods (42) is connected to a corresponding one of the second spherical hinges (45); the lower end of the top plate (41) is further connected to the electric push rod (44) through the first spherical hinge (43); a telescopic structure at a lower end of the electric push rod (44) is connected to a corresponding one of the second spherical hinges (45); and the attitude control system is fixed to the lower end of the horizontal frame system (3) by the top plate (41).

6. The test method according to claim 1, wherein the suspending release system (5) comprises the main load bearing block (501), the large gear disc (502), a bearing (503), rivets (504), transmission rods (505), screws (506), the guide rods (507), third linear bearings (508), the release sliding block (509), the small gear disc (510), a second motor (511) and a second motor bracket (512);

the large gear disc (502) is arranged on an upper side of the main load bearing block (501); the bearing (503) is sleeved in a center of the large gear disc (502); each transmission rod of the transmission rods (505) is hinged to the large gear disc (502) and a corresponding one of the guide rods (507) through a respective one of the rivets (504) and a respective one of the screws (506), wherein the respective one of the rivets and the respective one of the screws are arranged at two ends of the transmission rod, respectively; the release sliding block (509) is arranged at a lower end of the main load bearing block (501); four side surfaces of the main load bearing block (501) and four side surfaces of the release sliding block (509) are each provided with a hole; the hole in each of the four side surfaces of the main load bearing block is matched and communicated correspondingly with the hole in each of the four side surfaces of the release sliding block (509); and a corresponding one of the third linear bearings (508) is arranged on an inner wall of the hole;

an inward concave part of the main load bearing block (501) is of a regular quadrilateral structure, and is configured to be locked and completely engaged with the release sliding block (509) by retracting each of the guide rods (507) in a corresponding one of the third linear bearings (508); the second motor (511) is fixed to the main load bearing block (501) through the second motor bracket (512); the small gear disc (510) is fixed to the second motor (511); and the large gear disc (502) and the small gear disc (510) are configured to engage to complete a transmission process.

* * * * *